United States Patent [19]

Mailliet et al.

[11] Patent Number: 4,747,581
[45] Date of Patent: May 31, 1988

[54] DEVICE FOR THE MOVEMENT OF A SHAFT FURNACE PROBE

[76] Inventors: Pierre Mailliet, 1 alee Drosbach, Howald, G.D.; Emile Lonardi, 30 rue de Schouweiler, Bascharage, G.D.; Radomir Andonov, 5 rue Belle Vue, Mamer, G.D.; Victor Kremer, 95 rue de l'Egalite, Luxembourg, G.D., all of Luxembourg

[21] Appl. No.: 912,087

[22] Filed: Sep. 29, 1986

[30] Foreign Application Priority Data

Sep. 30, 1985 [LU] Luxembourg .................. 86100

[51] Int. Cl.⁴ ............................................. G01N 1/00
[52] U.S. Cl. ........................................ 266/99; 266/226; 73/863.85; 73/863.11
[58] Field of Search ................ 266/79, 226, 99, 87, 266/269, 287, 271; 73/863.11, 863.85

[56] References Cited

U.S. PATENT DOCUMENTS

| | | | |
|---|---|---|---|
| 3,632,100 | 6/1972 | Schneider | 266/226 |
| 3,869,369 | 3/1975 | Chang et al. | 266/99 |
| 4,218,918 | 8/1980 | Ueno et al. | 73/863.85 |
| 4,471,664 | 9/1984 | Mailliet et al. | 73/863.11 |
| 4,589,636 | 5/1986 | Bäumer et al. | 266/271 |

Primary Examiner—L. Dewayne Rutledge
Assistant Examiner—S. Kastler
Attorney, Agent, or Firm—Fishman, Dionne & Cantor

[57] ABSTRACT

A furnace probe is introduced transversely into a furnace through a support block and a sealing packing. In order to reduce the influence of distortions on the packing and support elements, a carriage is slidably mounted along a frame and is provided with at least one stirrup mounted thereon so as to be pivotable about a horizontal axis at right angles to the direction of a device for gripping the probe and driving it in the probe insertion direction when the carriage is moved in the direction of the furnace.

18 Claims, 6 Drawing Sheets

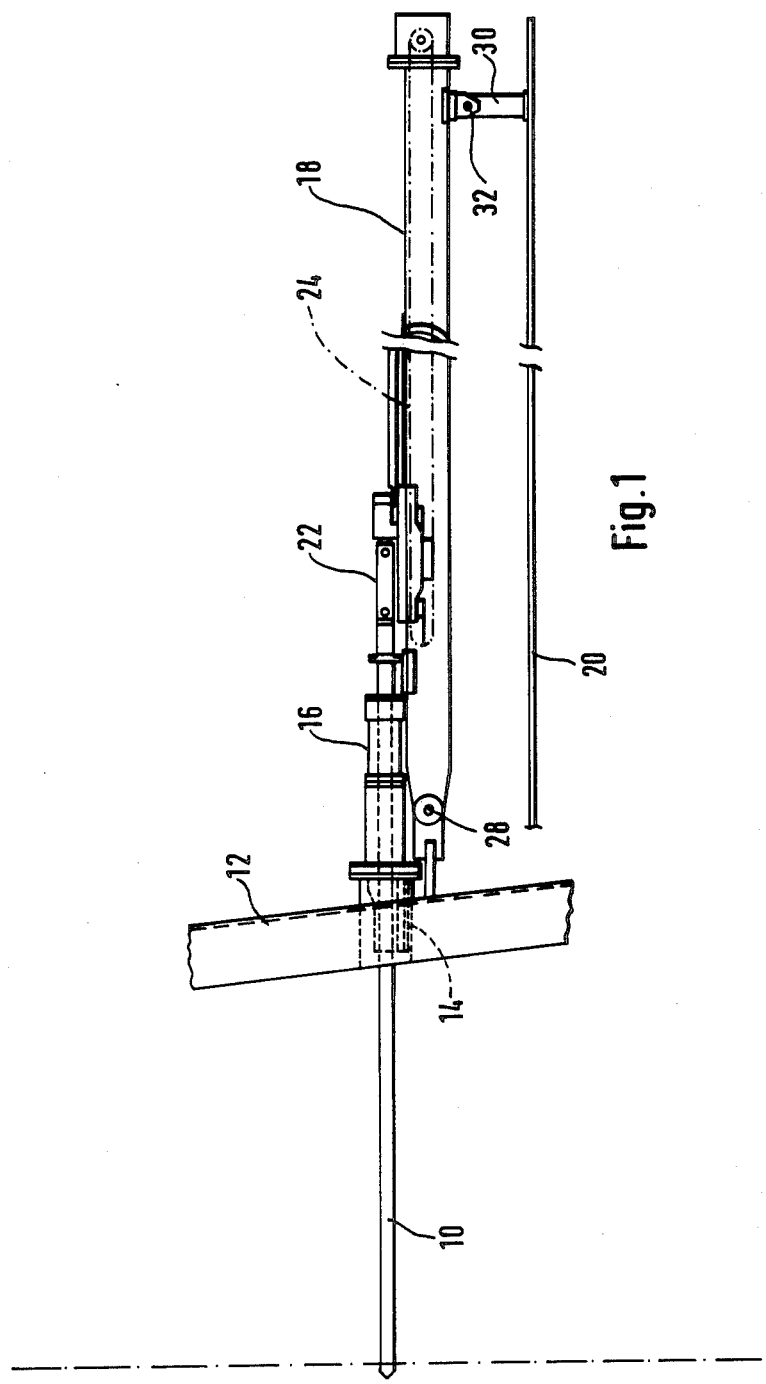

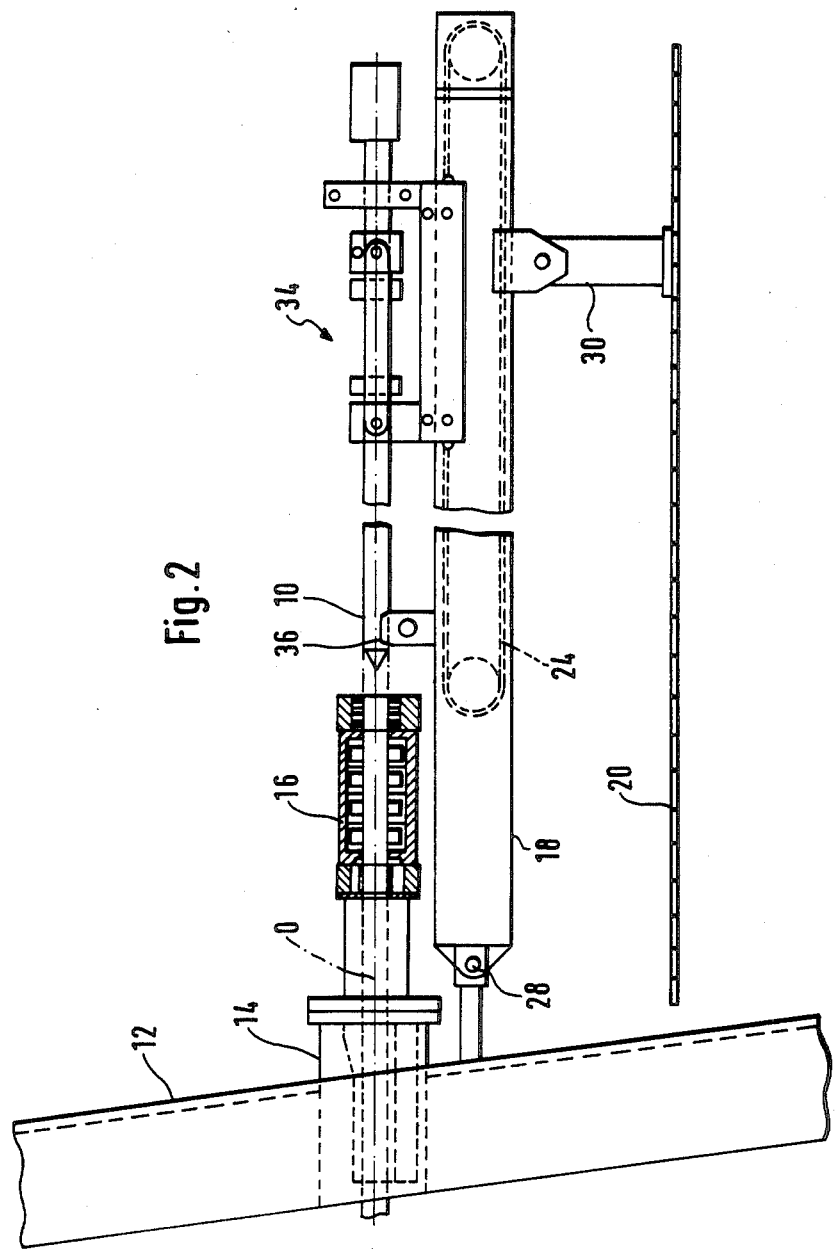

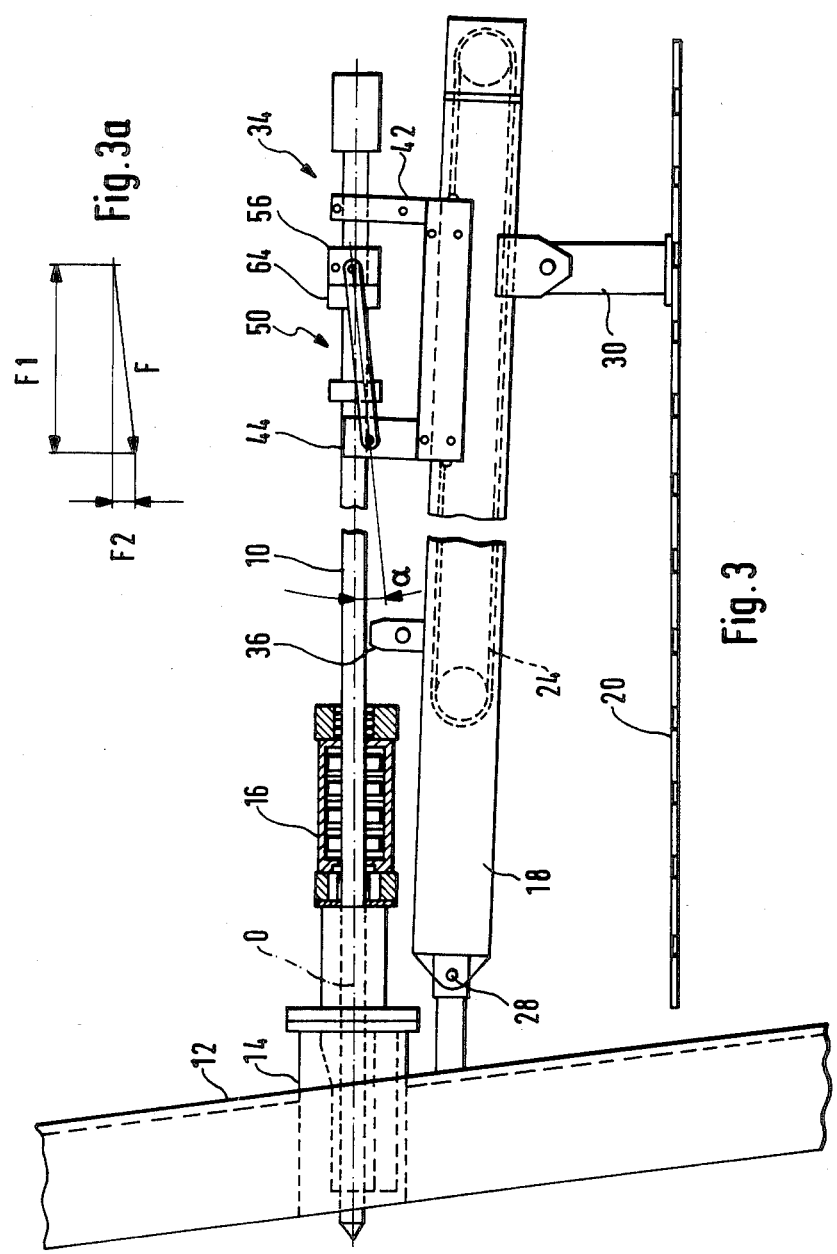

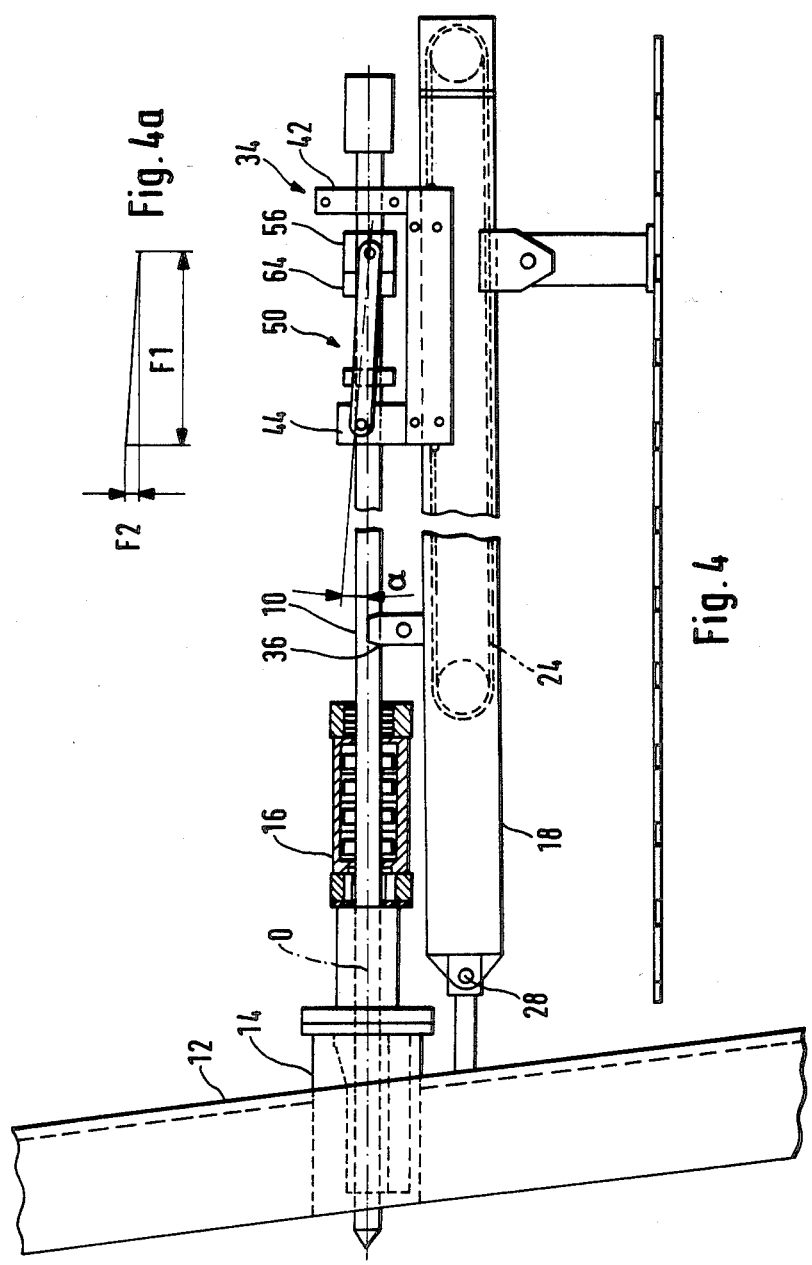

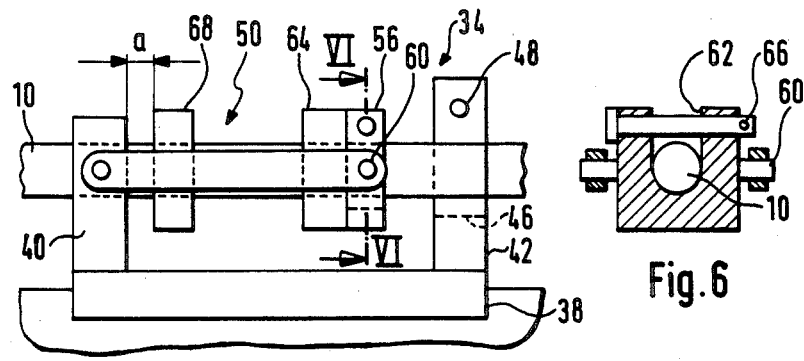
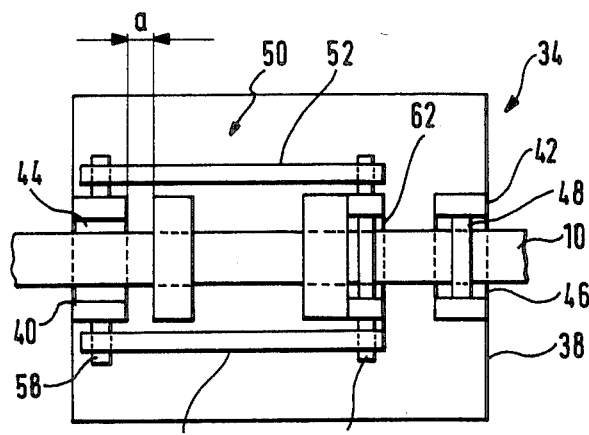

DEVICE FOR THE MOVEMENT OF A SHAFT FURNACE PROBE

BACKGROUND OF THE INVENTION

The present invention relates to a device for the displacement of a shaft furnace probe which is introduced transversely into a furnace through a support block and a sealing packing; the support block and sealing packing being fixed to the furnace wall. The present invention comprises a frame disposed at the side of the furnace in the probe insertion axis and is provided with means for inserting and extracting the probe.

Shaft furnace probes, per se, are well known and are intended for measuring the temperature at different predetermined points inside the furnace; and for taking gaseous samples for analysis. The result of these measurements and analyses enables the operation of the furnace to be monitored and controlled. European Pat. No. 0 056 941 responding to U.S. Pat. No. 4,471,664, assigned to the assignee hereof, all of the contents of which are incorporated herein by reference, shows, for example, a probe of this type; and more particularly its support block fixed to the furnace wall.

In view of the fact that shaft furnaces, particularly blast furnaces, presently operate at increasingly high temperatures, a difficult problem arises in connection with the sealing packing, which must contain the furnace pressure not only during measurements but, above all, during the insertion and extraction of the probe. To this end, it is necessary to provide in the packing a plurality of juxtaposed sets of sealing rings. For the latter to ensure effective and durable sealing, it is necessary that during its movement, the probe should subject these sealing rings to little or no stressing, or to the least possible stressing, which means that the probe must, if possible, always be moved along the axis of the packing.

The probe is generally moved by means of devices known per se, such as pneumatic or hydraulic hammers, or by means of an endless traction chain mounted on a frame disposed opposite the insertion opening and in the axis of the latter. However, because of thermal expansion, the armouring of the furnace undergoes vertical displacements, so that both the insertion opening and packing can "rise" or "fall" relative to the probe movement mechanism. In addition, this device, which is mounted on the work floor fastened to the square tower around the furnace, may undergo vertical displacements due to slight movements of the square tower. As the result of these movements, the axis of the movement of the probe may differ from the axis of the packing, and this difference may become relatively great if the movements of the furnace wall and of the tower are in opposite directions. As mentioned above, however, if the axis of the movement of the probe does not coincide with the axis of the packing, the force required for the movement of the probe contains a vertical component which, if excessive, may damage the packing.

SUMMARY OF THE INVENTION

The above-discussed and other problems of the prior art are overcome or alleviated by the device for the movement of a shaft furnace probe of the present invention. In accordance with the present invention, a new device is provided for the movement of a probe which makes it possible to reduce the influence of the above-discussed distortions on the packing and support elements; and to increase the effectiveness and durability of the packing.

In order to achieve this aim, the probe movement device of the present invention is essentially characterized in that the probe insertion and extraction means consist of a carriage sliding along the frame and provided with at least one stirrup mounted on the carriage in such a manner as to be pivotable about a horizontal axis at right angles to the direction of movement of the carriage. The stirrup includes means for gripping the probe and driving it in the probe insertion direction when the carriage is moved in the direction of the furnace.

In a preferred embodiment, the carriage comprises a baseplate, a front transverse wall on the furnace side and a rear transverse wall on the opposite side thereof, each of these walls having a cutout opening at the top or upper portion thereof for the passage of the probe; while the stirrup is mounted on the front wall and extends in the direction of the rear wall.

The means with which the stirrup is provided for gripping the probe is preferably in the form of a block mounted pivotally between the free ends of the two branches of the stirrup and is provided with a cutout for the passage of the probe; while the latter is provided with a first circular flange intended to be secured by simple contact with the block.

The probe preferably has a second flange similar to the first and lying at a distance from the latter which is less than the length of the stirrup.

The frame is preferably fastened at one end by an articulation having a horizontal pivot axis to the furnace wall, while at its other end, it rests pivotally on a foot or support erected on the work floor installed around the furnace.

The above-discussed and other features and advantages of the present invention will be apparent to and understood by those skilled in the art from the following detailed description and drawings.

BRIEF DESCRIPTION OF THE DRAWINGS

Referring now to the drawings wherein like elements are numbered alike in the several FIGURES:

FIG. 1 is a schematic front elevation view of an example of a device for moving a probe in accordance with the prior art;

FIG. 2 is a schematic front elevation view, partly in longitudinal cross-section, of a device in accordance with the present invention, in an idealized position;

FIG. 3 is a front elevation view of the device of FIG. 2, in a position in which the axes are offset in one direction;

FIG. 3A shows the effect of the offset of FIG. 3 on the movement forces;

FIG. 4 is a front elevation view of the device of FIG. 2, offset in the opposite direction to that shown in FIG. 3;

FIG. 4A shows the effect of the offset shown in FIG. 4A on the movement forces;

FIG. 5 is a schematic side elevation view of the carriage in the insertion phase;

FIG. 6 is a cross-sectional elevation view along the line VI—VI of FIG. 5;

FIG. 7 is a plan view of the carriage of FIG. 8;

DESCRIPTION OF THE PREFERRED EMBODIMENT

Figure 8:
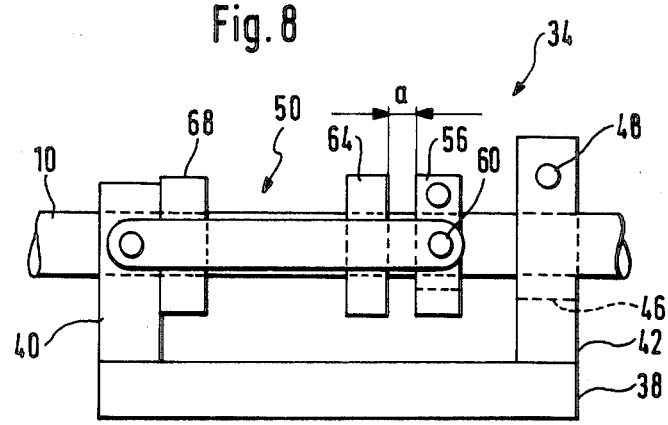
FIG. 8 is a front elevation view of the carriage of FIG. 5 during the extraction of the probe.

Referring first to FIG. 1, a probe 10 can be seen in its operative position in a blast furnace (symbolically represented by a portion of a blast furnace wall 12). Reference numeral 16 designates schematically the sealing packing, while reference numeral 14 designates a support and guide block of the type described in the previously mentioned U.S. Pat. No. 4,471,664. In view of the fact that support 14 is provided with top and bottom supporting means at a distance from one another, there is an additional reason for inserting the probe as far as possible in the axis of the packing and the axis defined by said two supporting means. The device for moving the probe 10 shown in FIG. 1 is a known device. This device comprises a frame 18 installed on the work floor 20 opposite the opening for the insertion of the probe 10. Frame 18 has a carriage 22 disposed thereon and adapted to slide along said frame through the action of a chain 24 driven by means known per se. Carriage 22 is provided with means for securing probe 10, for the purpose of inserting it into and extracting it from the furnace.

As described in U.S. Pat. No. 4,471,664, the device shown in FIG. 1 is provided with improved means for compensating for relative movements between furnace wall 12 and work floor 20, but it has been found that while suitable for their intended purposes, these known compensating means are still capable of improvement. The improved compensating means shown in FIG. 1 consists of fastening the front end of the frame 18 by an articulation having a horizontal pivot axis 28 to the furnace wall 12, so that the front end of frame 18 can follow the movements of wall 12. The rear end of frame 18 rests on a base or foot 30 erected on floor 20. An articulation having a horizontal pivot axis 32 between foot 30 and frame 18 permits the previously mentioned pivoting movements of the frame.

In order to reduce the influence of the relative vertical movements between furnace wall 12 and floor 20, as well as the influence of the natural curvature of probe 10 resulting from its cantilever support and the action of its own weight, the present invention includes a movement device of which a preferred form of construction is shown in FIG. 2. This device comprises an improved and novel carriage 34 movable along a frame 18 (identical to the frame 18 in FIG. 1). Probe 10 is shown in the withdrawn position (for example), awaiting insertion into the furnace and resting with its head on an intermediate support 36 fixed on frame 18.

Carriage 34, which is shown in greater detail in FIGS. 5, 6 and 7, comprises a baseplate 38 provided with a front transverse wall 40 and a rear transverse wall 42. The two walls 40 and 42 each have a central cutout 44, 46 (see FIG. 7) open at the top to permit the passage of probe 10. One of these cutouts, for example cutout 46, may be closed at the top by the passage of a transverse rod 4B driven through wall 42 to hole probe 10 in cutout 46.

A stirrup 50 serves as a connection between carriage 34 and the probe 10. Stirrup 50 consists of (1) two side branches 52, 54 mounted pivotally on a horizontal pin 58 fastened on front wall 40 at right angles to the direction of movement of carriage 34; and (2) a block 56 mounted pivotally between the opposite ends of the two branches where pin 5S is disposed. For this purpose, block 56, which is free to pivot about is horizontal suspension axis 60, is provided with a cutout 62 (see FIG. 6) for the passage of probe 10, while the latter is provided with a circular flange 64 intended to cooperate with block 56 of stirrup 50. In view of the fact that the latter is free to pivot about is suspension axis 58, it is necessary, in order to maintain its action on probe 10, to hold the latter captive in cutout 62. This can be accomplished, for example, by means of a rod 66 which is passed transversely through openings provided in the top portion of the two branches surrounding the cutout 62 (see FIG. 6).

Probe 10 is provided with a second circular flange 68 for the purpose of extracting the same. Second flange 68 is disposed nearer the furnace than flange 64, at a distance from the latter such that when flange 64 is in contact with block 56, a clearance represented by the length 'a' in FIGS. 5 and 7 exists between flange 68 and the front wall 40 of carriage 34.

The operation of the device of the present invention is clear from the drawings. In order to introduce probe 10 into the furnace, it is placed in the position shown in FIG. 1, that is, with the probe head resting on support 36, while the rear probe portion is supported by transverse walls 40 and 42 of carriage 34. Stirrup 50 is then attached to probe 10 by pivoting it about its axis 58 and enclosing probe 10 in cutout 62 by means of rod 66. Probe 10 is then in the waiting position for its insertion, this position being shown in FIG. 2.

For the purpose of inserting the probe, all that is required is to move carriage 34 forward in the direction of the arrow shown in solid lines in FIG. 5, by operating chain 24. Block 56 of stirrup 50 immediately comes into contact with the first flange 64 and drives the probe 10 as it moves forward, until the probe occupies the desired position.

Figure 9:
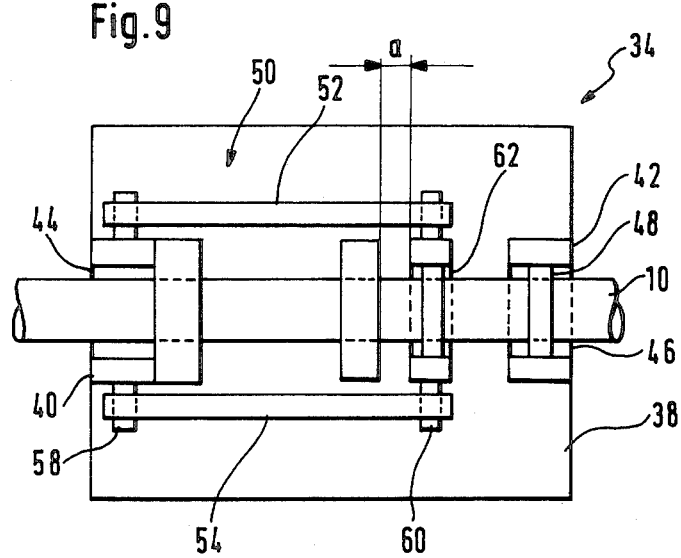
FIG. 9 is a plan view of the carriage shown in FIG. 8.

The extraction of the probe is illustrated in FIGS. 8 and 9. For this purpose, carriage 34 is moved in the opposite direction, as indicated by the arrow in solid lines in FIG. 8. The clearance "a" which previously existed between second flange 68 and front wall 40 of carriage 34 now exists between first flange 64 and block 56 of stirrup 50. On the other hand, the front wall 40 of carriage 34 comes into contact with the front face of flange 68, driving it and the probe 10 in the direction of the arrow to the desired position.

The advantages of the device according to the invention are clear from FIGS. 2–4. FIG. 2 shows the ideal position in which the direction of movement of carriage 34 is parallel to the axis 0 of packing 16; that is, the pivot axis of stirrup 50 moves perpendicularly along axis 0. In this position, the advantage of the pivoting stirrup has effect only in the event of the sagging of probe 10. When in its forward movement, probe 10 penetrates into packing 16, its tip is in fact supported in the latter, while its rear part, which is not supported vertically by carriage 34, is cantilevered and will sag slightly through the action of its own weight. It is here that the action of the stirrup 50 intervenes because, being pulled by the carriage 34 in the direction of the axis 0 and secured by its block 56 to the flange 64, stirrup 50 is automatically placed in the direction of traction through the action of the latter. Because of rubbing contact between block 56 and flange 64 of probe 10, the latter is straightened and retains its alignment with the axis 0.

This would not be the case if stirrup 50 were not present. In other words, if stirrup 50 were not present, the thrust on probe 10 would act through contact between flange 56 and the rear wall 42 of carriage 34.

However, because of the sagging of the probe, the axis of the latter would at that point, be situated below a line extending along axis 0, so that the thrust force would be exerted parallel to and not along axis 0. Moreover, because of the friction between wall 42 and flange 56, the probe cannot straighten itself. To the contrary, the non-axial thrust gives rise to a vertical component, which becomes increasingly great in proportion as carriage 34 approaches the packing, thus entailing the risk that the packing will quickly be damaged and increasing the guide forces in the supports.

The contrary effect is obtained on extraction of the probe. Contact between wall 40 of carriage 34 and flange 68 of probe 10 in fact becomes advantageous because, as the result of the traction, the frictional force between the contact surfaces prevents the probe from sagging under the influence of its own weight, which means that it is extracted along a line forming an extension of the axis of packing 16 and of the support points, whatever the inclination in relation to the ideal alignment.

FIG. 3 illustrates the situation resulting from a vertical displacement between furnace wall 12 and floor 20, in which the direction of movement of carriage 34 is oblique in relation to axis 0. It should however be emphasized that the mutual inclinations are exaggerated in the drawings to facilitate explanation.

It should also be noted that in the case of FIG. 3, the difference in alignment between axis 0 and the direction of the traction exerted by the carriage will be partially or even completely compensated, depending on its amplitude, by the sagging of probe 10 due to its cantilever support. If, despite this, there is a divergence, as shown in FIG. 3, the direction of the tractive force F exerted by stirrup 50 on probe 10 at flange 64 forms an angle $\alpha$ with the axis 0. This force F thus has, in accordance with FIG. 3a, a component $F_1$ in the direction of axis 0 and a component $F_2$ being, in principle, detrimental to the alignment of the probe by the support points. However, taking into account the absence of friction (because of the pivoting suspension of the stirrup 50) and also taking into account the low value of the angle $\alpha$, this vertical component $F_2$ is negligible in comparison with the component $F_1$. Furthermore, because of the inclination of frame 18 resulting from its articulation to the furnace wall 12 and from the pivoting suspension of the stirrup 50, angle $\beta$ decreases in proportion as carriage 34 approaches packing 16 (in proportion as the influence of the vertical component $F_2$ becomes increasingly weak). On the other hand, if in the absence of the pivoting stirrup, the probe were driven in by simple thrust applied by carriage 34, the angle $\alpha$ would remain constant throughout the movement of carriage 34 and the influence of the vertical component $F_2$ would not only increase, but would be supplemented by a perceptable vertical component due to friction between flange 64 and wall 42 of carriage 34.

During the extraction of probe 10, when flange 68 is driven by wall 40 of the carriage, the benefit of the advantage of pivoting stirrup 50 no longer exists. On the other hand, two other favorable factors intervene during extraction. Firstly, the natural sag of the probe as its extraction proceeds tends to compensate for the transverse force of the oblique traction of the carriage. In addition, the extraction force is generally smaller than the force introducing probe 10 into the furnace, so that the frictional force at the point of contact between the flange and the carriage wall is much smaller, and relative sliding between these two surfaces is possible.

FIG. 4 shows a situation resulting from a relative displacement between furnace wall 12 and floor 20 in the opposite direction to that which brought about the situation shown in FIG. 3. In this case, the direction of the tractive force exerted by stirrup 50 also forms an angle relative to the axis 0, but in the opposite direction to that occuring in the case of FIG. 3. In the situation shown in FIG. 4, all the remarks made in connection with FIGS. 2 and 3 are also applicable. In other words, because of the pivotal suspension of stirrup 50 and the absence of friction between the contact surfaces, the transverse component $F_2$ is negligible and in addition decreases in proportion as carriage 50 approaches the packing 16.

During the extraction of the probe, the situation is similar to that shown in FIG. 2, that is, the friction at the point of contact between wall 40 and flange 68 opposes the force resulting from the sagging of probe 10 (i.e., probe tends to straighten itself). As a result, carriage 34 with its pivoting stirrup offers advantages in each of the situations shown in FIGS. 2 and 4, both during the introduction of the probe and during its extraction.

Instead of providing a single pivoting stirrup, as shown in the drawings, it is possible to provide two stirrups, the second being mounted on the rear wall 42 of the carriage and extending forwards in the direction of the wall 40. In order to prevent these two stirrups from hindering one another, the side branches would preferably be arched in opposite directions.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A device for the movement of a shaft furnace probe, which is introduced transversely into the furnace through a support block and a sealing packing, the device comprising:

frame means disposed outside of the furnace along the probe insertion axis, said frame means being provided with means for inserting and extracting the probe;

said inserting and extraction means comprising;

carriage means slidably mounted on said frame means, said carriage means being provided with at least one stirrup means pivotably mounted thereon, said stirrup means being pivotable about a horizontal axis at right angle to the direction of movement of said carriage means, said stirrup means including means for gripping the probe and driving it in the probe insertion direction when said carriage means is moved in the direction of the furnace; and said carriage means comprising:

a baseplate;

a front transverse wall;

a rear transverse wall opposed from said front transverse wall, each of said walls having a cutout opening at the upper portions thereof for the passage of the probe; and said stirrup means being mounted on said front wall and extending in the direction of said rear wall.

2. The device according to claim 1 wherein said stirrup means includes a pair of side branches and wherein said means with which said stirrup means is provided for gripping the probe comprises:
  block means pivotally mounted between free ends of said pair of side branches of said stirrup means;
  a cutout for the passage of the probe; and
  the probe having a first circular flange intended to be gripped by contact with said block means.

3. The device according to claim 3, wherein:
  the probe is provided with a second circular flange, said second flange being positioned at a distance from said first flange which is less than the length of said stirrup means.

4. The device of claim 1 wherein:
  said frame means is fsatened at one end by means of an articulation having a horizontal pivot axis to the furnace wall; and
  said frame means rests by its other end pivotally on a support positioned on the work floor installed around the furnace.

5. The device of claim 2 wherein:
  said frame means is fastened at one end by means of an articulation having a horizontal pivot axis to the furnace wall; and
  said frame means rests by its other end pivotally on a support positioned on the work floor installed around the furnace.

6. The device of claim 1 wherein:
  said frame means is fastened at one end by means of an articulation having a horizontal pivot axis to the furnace wall; and
  said frame means rests by its other end pivotally on a support positioned on the work floor installed around the furnace.

7. The device of claim 3 wherein:
  said frame means is fastened at one end by means of an articulation having a horizontal pivot axis to the furnace wall; and
  said frame means rests by its other end pivotally on a support positioned on the work floor installed around the furnace.

8. The device of claim 1 wherein:
  said frame means is fastened at one end by means of an articulation having a horizontal pivot axis to the furnace wall; and
  said frame means rests by its other end pivotally on a support positioned on the work floor installed around the furnace.

9. The device according to claim 1 wherein:
  said cutouts in said rear wall of said carriage means include closure bolts.

10. The device according to claim 2 wherein:
  said cutouts in said rear wall of said block means include closure bolts.

11. The device according to claim 1 including a furnace having a furnace wall and wherein:
  said support block and said sealing packing are fixed to said furnace wall.

12. A device for the movement of a shaft furnace probe, which is introduced transversely into the furnace though a support block and a sealing packing, the device comprising:
  frame means disposed outside of the furnace along the probe insertion axis, said frame means being provided with means for inserting and extracting the probe;
  said inserting and extraction means comprising;
  carriage means slidably mounted on said frame means, said carriage means being provided with at least one stirrup means pivotably mounted thereon, said stirrup means being pivotable about a horizontal axis at right angles to the direction of movement of said carriage means, said stirrup means including means for gripping the probe and driving it in the probe insertion direction when said carriage means is moved in the direction of the furnace;
  wherein said stirrup means includes a pair of side branches and wherein said means with which said stirrup means is provided for gripping the probe comprises;
  block means pivotally mounted between free ends of said pair of said branches of said stirrup means;
  a cutout for the passage of the probe; and
  the probe having a fist circular flange intended to be gripped by contact with said block means.

13. The device according to claim 12 wherein said carraige means comprises:
  a baseplate;
  a front transverse wall;
  a rear transverse wall opposed from said front transverse wall, each of said walls having a cutout openieng at the upper portions thereof for the passage of the probe; and
  said stirrup means being mounted on said front wall and exending in the direction of said rear wall.

14. The device according to claim 12 wherein: the probe is provided with a second circular flange, said second flange being positioned at a distance from said first flange which is less than the length of said stirrup means.

15. The device of claim 12 wherein:
  said frame means is fastened at one end by means of an articulation having a horizontal pivot axis to the furnace wall; and
  said frame means rests by its other end pivotaly on a support positioned on the work floor installed around the furnace.

16. The device of claim 13 wherein:
  said frame means is fastened at one end by means of an articulation having a horizontal pivot axis to the furnace wall; and
  said frame means rests by its other end pivotally on a support positioned on the work floor installed around the furnace.

17. The device according to claim 12 wherein:
  said cutouts in said rear wall of said block means include closure bolts.

18. The device according to claim 12 including a furnace having a furnace wall and wherein:
  said support block and said sealing packing are fixed to said furnace wall.

* * * * *